United States Patent [19]

Walters

[11] 4,413,758

[45] Nov. 8, 1983

[54] COMPLETE AIR-FLOW DISPENSERS

[76] Inventor: Armon J. Walters, 39 Haverhill Rd., Trumbull, Conn. 06611

[21] Appl. No.: 266,235

[22] Filed: May 22, 1981

[51] Int. Cl.$^3$ .............................................. B65G 69/06
[52] U.S. Cl. ..................................... 222/195; 366/101
[58] Field of Search ..................... 222/630, 195, 386.5; 221/278; 366/101, 106, 107

[56] References Cited

U.S. PATENT DOCUMENTS

| | | | |
|---|---|---|---|
| 1,971,852 | 8/1934 | Goebels | 222/195 X |
| 3,199,923 | 8/1965 | Brooks | 222/195 X |
| 3,201,000 | 8/1965 | Hermanns | 222/195 X |
| 3,212,824 | 10/1965 | Emery et al. | 222/195 X |

Primary Examiner—Stanley H. Tollberg
Attorney, Agent, or Firm—Cifelli, Frederick & Tully

[57] ABSTRACT

Containers for receiving solid particulate product and for fluidizing and dispensing said product under the influence of a pressurized air flow. The present containers comprise a product compartment having a substantially vertical interior wall of air-permeable fabric, structure for supporting said vertical interior wall closely spaced from the exterior, vertical shell or wall of the container to provide an interconnecting narrow air space therebetween around the entire inner periphery of said shell, and structure for introducing pressurized air into said air space and through the air-permeable interior wall to fluidize substantially all of said particulate product which is in contact with said substantially vertical, air-permeable fabric inner wall.

8 Claims, 4 Drawing Figures

COMPLETE AIR-FLOW DISPENSERS

BACKGROUND OF THE INVENTION

The present invention relates to novel receptor-dispenser containers which are adapted to be filled with a supply of solid particulate material, such as a powder composition, and to dispense said material, as required. Since some such powder materials tend to agglomerate or cake and will not flow freely through an opening in the base of the container, it is known to provide air-flow bases on such containers. The air-flow base comprises an air-permeable floor through which pressurized air is introduced to fluidize the powder material and assist the flow of the material out of an opening and into another container which may be a feed hopper opening into a pneumatic conduit.

Many such air-flow containers are known and reference is made to U.S. Pat. No. 3,777,775 and to my co-pending U.S. patent application, Ser. No. 241,971 filed Mar. 9, 1981, for a discussion of such containers and the methods in which they are used.

While the other known containers represent a substantial improvement over dispenser containers which do not contain air-flow means and are completely satisfactory for use with most solid particulate materials, I have found that they are not satisfactory for use with certain solid particulate materials which have excessive agglomeration or caking properties, since such materials become so packed and united within the container that they form masses which adhere to the vertical inside walls of the container, above the porous or air-permeable floor, and are unaffected by the air flow passing up through the floor of the container. Powder materials which present this problem include pigment compounds such as lead compounds and titanium dioxide and various compounds with high fat content.

SUMMARY OF THE INVENTION

The novel receptor-dispenser containers of the present invention comprise substantially vertical-walled product compartments which are provided with an air-permeable fabric liner forming an interior wall which is supported by the vertical or near vertical exterior wall of the container in spaced relationship thereto to provide therebetween an interconnected narrow air space into which pressurized air can be injected. The air-permeable interior wall can comprise the entire interior surface of the container or such a substantial portion of the entire interior surface that all or most of the solid particulate material within the container which is in contact with the container is in contact with the air-permeable fabric wall and is directly exposed to the fluidizing action of the air forced through said fabric wall to dislodge said material from the wall into the turbulent air within the container. The phrase "substantially vertical" is intended to include product compartment walls which are vertical, i.e., true cylinders, as well as product compartment walls which are inclined or declined within about 15° from vertical.

According to one embodiment of the present invention, the present receptor-dispenser containers comprise a cylindrical product compartment section and an air-flow base, at least the cylindrical product compartment section comprising the air-permeable fabric inner wall structure of the present invention, and the air-flow base being of similar structure or of structure conventional in the art.

According to a preferred embodiment of the present invention, the present receptor-dispenser containers comprise a conical air-flow base having the air-permeable fabric inner wall structure discussed above, said conical air-flow base section being used in association with an upper cylindrical product compartment section as described above.

THE DRAWING

Figure 1:
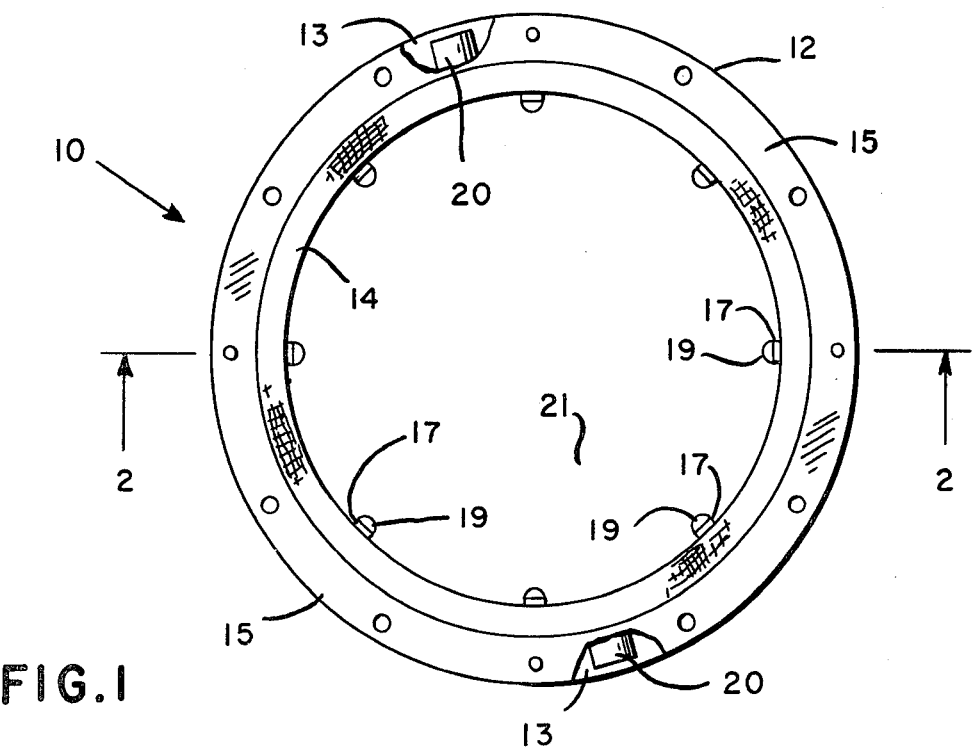
FIG. 1 is top view of a cylindrical receptor-dispenser air-flow container section according to one embodiment of the present invention, portions thereof being cut away for purposes of illustration.
Figure 2:
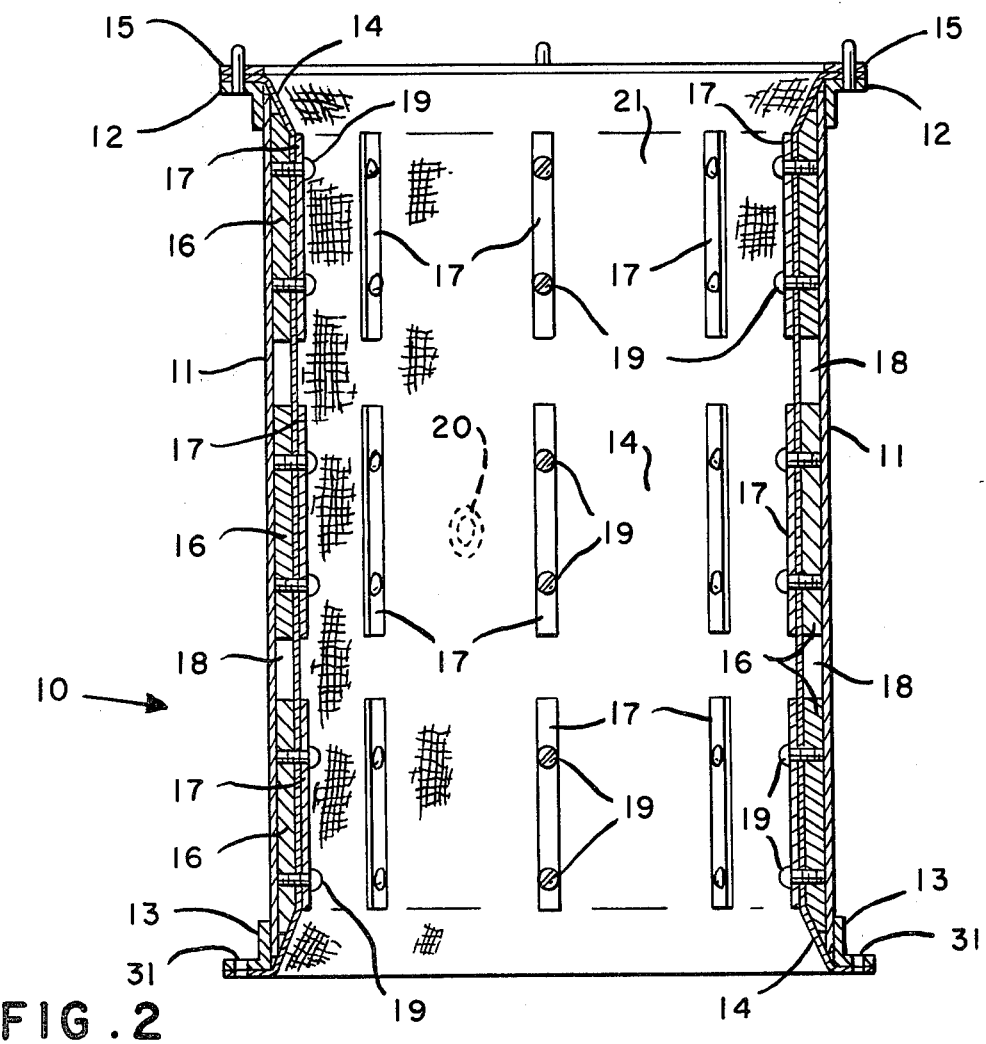
FIG. 2 is a vertical cross-section view taken along the line 2—2 of FIG. 1.

Referring to the drawing, the essential novelty of the present invention resides in an air-flow container having a product compartment section having a substantially vertical inner wall of air-permeable fabric which substantially completely overlies a narrow, interconnected air space between said fabric and the outer supporting wall or shell of the container, said air space being open to a source of fluidizing air. FIGS. 1 and 2 illustrate such a product compartment section 10 having a cylindrical shell or outer wall 11 having an annular upper lip flange 12 providing an air-tight attachment means to an air-release filter means, not shown, such as a pulse jet filter, and having an annular lower lip flange 13 providing an air-tight attachment means to an air-flow base, such as the conical base of FIGS. 3 and 4.

The lip flanges 12 and 13 provide sealing means for the upper and lower ends of an air-permeable fabric cylinder or sleeve 14 which has a diameter slightly less than the inner diameter of the shell or outer wall 11 but which is stretchable at the ends to permit the ends to be drawn over the outer faces of the flanges 12 and 13 and held thereagainst by engagement between flange 12 and the upper fabric retainer ring 15 at the top and between flange 13 and the air-flow base at the bottom.

As shown by FIG. 2, the fabric sleeve 14 is supported by the outer shell or cylinder 11, closely spaced therefrom, by means of plurality of narrow spacers 16 and a plurality of narrow retainer strips 17, the spacers maintaining the fabric sleeve 14 slightly away from the inside wall of the shell or cylinder 11 to provide a narrow interconnecting air space 18 around the entire inner circumference or periphery of the shell wall 11. The retainer strips 17 confine the fabric sleeve between themselves and the exposed or inner surface of the spacers 16 and a plurality of fasteners 19 pass through each retainer strip 17 and the fabric sleeve 14 and are engaged by each spacer 16 to secure the sleeve 14 in place. As shown, the spacers 16 are attached to the inner surface of the shell or container 11 and are uniformly spaced around the inner circumference thereof to provide a plurality of anchoring points for the sleeve 14. In order to minimize the area of the fabric sleeve 14 which is not directly exposed to the air space 18, the spacers 16 and strips 17 are kept as narrow as possible. Also a plurality of spacers 16 and strips 17 are used along the length of the cylinder 11, as well as around the inner periphery thereof in order to maximize the free flow of air through the air space 18 around the entire inner periphery of the cylinder 11. The air space 18 is open through the wall of the cylinder 11 by means of air inlets 20, shown through the cut-away portions of FIG. 1, to which air hoses are adapted to make air-tight engagement to permit the introduction of pressurized fluidizing air into the interconnected air space 18, from which the fluidizing air can only escape by passage through the fabric sleeve 14 into the interior of the product compartment 21.

The fluidizing air passing through substantially the entire inner wall of the container, i.e., through the fabric sleeve 14, causes the solid particulate material which is in contact with the sleeve 14 to be aerated and fluidized within the compartment 21 so that it can flow freely from the compartment down onto the air-flow base and out the product-discharge opening. The excess fluidizing air is drawn up out of the compartment through a filter, such as a pulse jet filter, which separates the fluidized product particles from the air and releases the filtered air to the atmosphere. Reference is made to my co-pending application, Ser. No. 203,015, filed Nov. 3, 1980, for a more complete disclosure of air-flow systems and pulse jet filters with which the novel receptor-dispensing containers of the present invention may be used.

Figure 3:
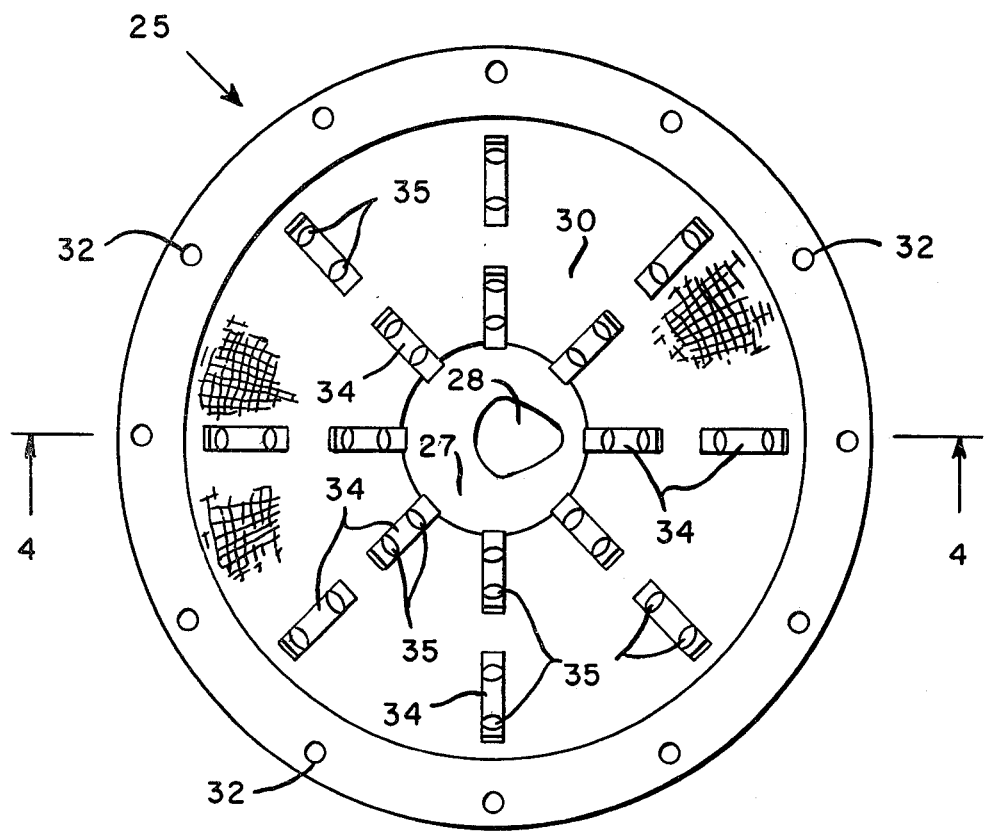
FIG. 3 is a top view of a conical air-flow base section for use with the container section of FIGS. 1 and 2 according to a preferred embodiment of the present invention.
Figure 4:
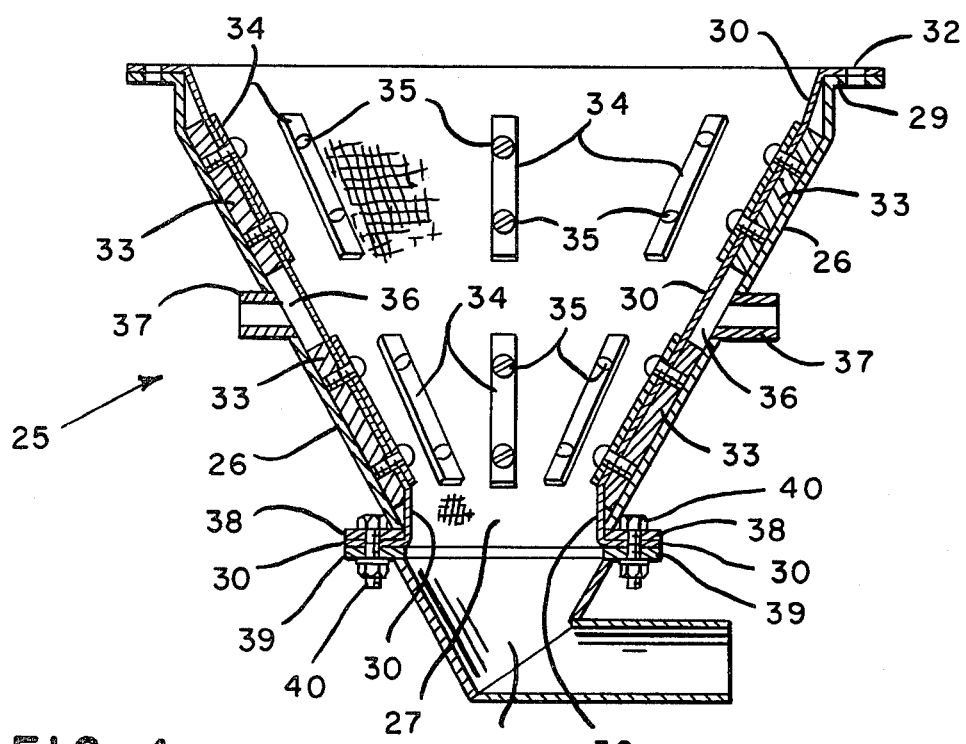
FIG. 4 is a vertical cross-section view taken along the line 4—4 of FIG. 3.

The conical air-flow base 25 of FIGS. 3 and 4 is particularly suited for use with the vertical-walled product compartment section of FIGS. 1 and 2 in order to provide a composite container which is suitable for use with particulate materials which are the most difficult to fluidize. Such composite container has a conical air-flow base having walls inclined at an angle of at least about 45° from horizontal and most preferably between about 50° and 70° from horizontal, and has an interior product-engaging wall which consists nearly entirely of air-permeable fabric to provide maximum access of the fluidizing air to substantially all of the particulate product which is in contact with the inner fabric surface of the container.

The air-flow base 25 of FIGS. 3 and 4 is similar in structure and function to the air-flow product compartment section 10 of FIGS. 1 and 2 except that the outer base wall 26 is conical in shape and tapers down to a central discharge opening 27 which communicates with an outlet element 28 which is adapted to be connected to a vacuum conduit, or other receptor such as a rotary feeder.

The conical base wall 26 is provided with an annular upper lip flange 29 having the same inner and outer diameter as the annular lower lip flange 13 of the product compartment section 10 so as to mate therewith and confine both the fabric sleeve 14 and the fabric cone 30 of the air-flow base therebetween when the base 25 and the compartment section 11 are united by the passage of bolts through the aligned holes 31 and 32 in said flanges and through said superposed layers of fabric 14 and 30.

As illustrated, the conical, flexible, air-permeable fabric liner 30 is supported by the conical base wall 26 in spaced relationship thereto by means of spacers 33, retainer strips 34 and fasteners 35 which are similar to corresponding elements 16, 17 and 19, respectively, of FIGS. 1 and 2. This maintains the conical base wall 26 to provide an interconnected air space 36 around the entire inner periphery of the conical wall 26, which air space is open through outlets 37 adapted to be connected to air hoses to introduce pressurized fluidizing air to and around said air space 36 and through the fabric 30 to fluidize particulate product resting on said fabric.

As shown, the conical base is truncated and provided with an annular lower flange 38 which mates with an annular upper flange 39 on the outlet tube element 28, and the lower end of the conical fabric sleeve 30 is drawn out over the bottom face of the flange 38 and confined between flanges 38 and 39 when the flanges are connected by means of bolts and nuts 40 which pass through aligned holes in said flanges and through the fabric therebetween.

While the preferred embodiment of the present invention is represented by a composite container comprising an air-flow product compartment section 10 having a full air-flow vertical wall, as illustrated by FIGS. 1 and 2, and a conical air-flow base 25 having a full air-flow conical floor, as illustrated by FIGS. 3 and 4, it should be understood that the present full air-flow product compartment section 10 provides improved results when used in combination with any air-flow base having a conical, tapered or otherwise inclined porous floor, such as that of my aforementioned co-pending U.S. patent application Ser. No. 241,971 filed on Mar. 9, 1981 or of U.S. Pat. No. 3,777,775. Also, while the present full air-flow product compartment section 10 preferably is cylindrical or round in cross-section, as illustrated, it may be rectangular or square in cross-section for use with an air-flow base of similar cross-section. The critical novel requirement is that the product container section 10 has a substantially-vertical interior wall of air-permeable fabric which is supported in closely-spaced relation by the rigid outer wall of the container to provide therebetween an interconnected air space which permits the introduced pressurized fluidizing air to flow freely around substantially the entire inner circumference of the rigid outer wall so as to be free to flow through substantially the entire air-permeable fabric inner wall to dislodge and fluidize substantially all of the contained particulate product. This represents a substantial improvement over prior-known containers which only were provided with air-flow means in the base or floor and which are unsatisfactory for use with certain particulate materials having high agglomerating properties.

Another important advantage of the novel air-flow containers of the present invention arises from the fact that the product compartment and the air-flow base have separate and distinct connections to the source of fluidized air and separate and distinct narrow air spaces for fluidizing purposes so that either the product compartment or the air-flow base may be subjected to the fluidizing air independently of the other in order to concentrate the fluidization effect through either the porous floor of the base or through the vertical walls of the product compartment. Generally, both air supply systems will be operated simultaneously but it may be desirable, with certain types of solid particulate material, to operate the fluidizing air only through the air-flow base until an initial portion of product is dispensed and then to activate the air flow through the product compartment walls to loosen any product clinging to the porous interior wall thereof. It may also be useful to alternate the air flow through the base and through the product compartment wall in pulses in order to concentrate the effects of the supply air and to agitate the product particles in different directions to prevent them from being forced in one direction and accumulated as a compacted mass on a solid surface.

It will be clear from the present disclosure that the air-permeable fabric inner wall of the product compartment and/or the air-permeable floor of the air-flow base may comprise any conventional air-flow fabric having the property of preventing the solid particulate material, such as fine powder, from passing therethrough into the underlying aeration air space. Most commonly used fabrics are strong canvas fabrics which are manufactured for this purpose. Other woven and non-woven textile fabrics, microporous plastic air filters and microporous sintered metal filters can also be used, if desired.

It will also be clear that the aeration air inlets of the air-flow base and of the product compartment can both be connected to the same source of compressed air for simultaneous operation and that automatic valve means, such as solenoid valves, may be provided on the air lines to either or both the air-flow base and the product compartment in order to produce any desired aeration sequence.

While the embodiment illustrated by the drawing, FIGS. 2 and 4, shows the use of individual spacer elements 16 and 33 which are fastened to the inner surface of the outer walls 11 and 26, respectively, in order to support the porous fabric inner walls in closely-spaced relation to the outer walls, it will be clear that such spacers may be an integral part of the inner surfaces of the walls 11 and 26 which may be fluted or corrugated to provide spaced attachment points for the porous inner wall and intermediate narrow air spaces which are interconnected with each other in all directions to permit the free flow of aeration air around the entire inner periphery of the rigid outer wall.

While the air-flow product compartment sections of the present invention are defined as having an air-permeable fabric inner wall which substantially completely surrounds the product compartment, it should be understood that the present product compartment sections may contain an access door on the rigid outer supporting wall to permit the interior of the product compartment to be inspected in the event of malfunction. This alleviates the necessity of disassembly of the unit in cases where simple access to the interior of the product compartment may be sufficient to correct the problem.

In cases where an access door is provided on the outer supporting wall, such door preferably is mounted for air-tight engagement with the inside surface of the outer wall and opens into the product compartment. The porous fabric inner wall is not present behind the access door but rather engages the interior surface of the rigid outer wall around the periphery of the access opening.

Variations and modifications of the present invention will be apparent to those skilled in the art within the scope of the present claims.

I claim:

1. An air-flow container assembly adapted to receive a supply of solid, particulate material and to dispense said material through an opening in the base thereof under the influence of pressurized fluidizing air introduced to said container, said assembly comprising an upper air-flow product compartment and a lower air-flow base which is releasably attached to said product compartment, said base comprising a porous floor for said product compartment comprising an air space covered by a layer of air-permeable fabric, and means for receiving a supply of pressurized fluidizing air into said air space and for directing said air up through said air-permeable floor to fluidize product in contact with said floor, said product compartment having a rigid outer wall, a porous inner wall comprising a layer of air-permeable fabric supported by said outer wall closely spaced therefrom to provide a narrow interconnected air space therebetween which substantially completely surrounds said product compartment, and means for receiving a supply of pressurized fluidizing air through said rigid outer wall and into said narrow interconnected air space to cause said fluidizing air to surround said product compartment and pass through said air-permeable inner wall from all sides to fluidize product in contact with said inner wall and cause said fluidized product to flow down to said air-flow base, said base and said product compartment each comprising means for releasably attaching said elements to each other and for confining therebetween adjacent extremities of the layers of the fabrics which form the porous floor of said base and the porous wall of said product compartment to isolate the air spaces underlying said porous floor and said porous wall.

2. A container according to claim 1 in which said air-flow base comprises an inclined rigid outer wall, an inclined porous inner wall of air-permeable fabric supported by said outer wall closely spaced therefrom to provide a narrow interconnected air space therebetween, said flexible inner wall forming an inclined porous air-permeable floor for said product compartment and the narrow interconnected air space of said air-flow base substantially completely surrounding said air-permeable floor.

3. A container according to claim 1 in which said product compartment comprises substantially cylindrical outer and inner walls.

4. A container according to claims 1, 2 or 3 in which said air-flow base comprises conical outer and inner walls.

5. A container according to claim 1 in which the flexible inner wall of the product compartment is supported by the rigid outer wall thereof by means of a plurality of spaced, narrow support elements which are attached around substantially the entire periphery of the inner surface of the outer wall, each support element comprising means to which a portion of said fabric inner wall is attached in spaced relation to said outer wall.

6. A container according to claim 1 in which the upper end of said air-flow product compartment comprises means for attaching thereto a filter means to permit the release of fluidizing air from the air-flow container while retaining the fluidized solid particulate material therewithin.

7. A container according to claim 1 in which the lower end of said air-flow base comprises means for connection to a means for delivering fluidized solid particulate material from the air-flow container to a receptor.

8. A container according to claim 1 in which the means for receiving a supply of pressurized air into said base and into said product compartment are separate and distinct whereby pressurized air can be supplied to either said base or to said product container independently of the other.

* * * * *